(12) United States Patent
Zimmermann et al.

(10) Patent No.: US 7,470,080 B2
(45) Date of Patent: Dec. 30, 2008

(54) CLAMPING MECHANISM

(75) Inventors: Heinrich Zimmermann, Bruchsal (DE);
Uwe Häcker, Weingarten (DE);
Joachim Sander, Ubstadt-Weiher (DE);
René Richert, Riedselz (FR)

(73) Assignee: Sew-Eurodrive GmbH & Co., Bruchsal (DE)

( * ) Notice: Subject to any disclaimer, the term of this patent is extended or adjusted under 35 U.S.C. 154(b) by 95 days.

(21) Appl. No.: 10/362,978

(22) PCT Filed: Sep. 12, 2001

(86) PCT No.: PCT/EP01/10520

§ 371 (c)(1),
(2), (4) Date: Feb. 28, 2003

(87) PCT Pub. No.: WO02/33277

PCT Pub. Date: Apr. 25, 2002

(65) Prior Publication Data

US 2004/0037638 A1  Feb. 26, 2004

(30) Foreign Application Priority Data

Oct. 16, 2000  (DE) ................ 100 51 275
Dec. 1, 2000  (DE) ................ 100 60 037

(51) Int. Cl.
*F16D 1/06* (2006.01)
(52) U.S. Cl. .............. 403/1; 403/16; 403/369; 403/370
(58) Field of Classification Search ........ 403/1, 403/16, 365, 367–371, 373, 374.1–374.4
See application file for complete search history.

(56) References Cited

U.S. PATENT DOCUMENTS

| | | | | |
|---|---|---|---|---|
| 2,718,155 A * | 9/1955 | Firth | ........... | 403/370 |
| 2,849,886 A * | 9/1958 | McCloskey | ........... | 403/370 |
| 2,889,161 A * | 6/1959 | Powell et al. | ........... | 403/370 |
| 3,782,841 A * | 1/1974 | Winckelhaus | ........... | 403/370 |
| 3,998,563 A * | 12/1976 | Kloren | ........... | 403/370 |
| 4,053,244 A * | 10/1977 | Dively | ........... | 403/370 |
| 4,268,185 A * | 5/1981 | Mullenberg | ........... | 403/370 |
| 5,496,127 A | 3/1996 | Mueller et al. | | |
| 5,746,536 A * | 5/1998 | Hutchings et al. | ........... | 403/370 |
| 5,951,198 A * | 9/1999 | Phillips | ........... | 403/370 |
| 6,599,052 B1 * | 7/2003 | Phillips | ........... | 403/370 |

FOREIGN PATENT DOCUMENTS

| | | |
|---|---|---|
| CH | 265 280 | 11/1949 |
| DE | 17 84 994 | 3/1959 |
| DE | 37 44 285 | 7/1989 |
| DE | 41 41 266 | 6/1993 |
| DE | 42 30 941 | 3/1994 |
| DE | 200 9 845 U | 10/2000 |

* cited by examiner

*Primary Examiner*—Victor MacArthur
(74) *Attorney, Agent, or Firm*—Kenyon & Kenyon LLP (57) ABSTRACT

A clamping mechanism for securing a hollow shaft on a solid shaft, the hollow shaft having, at least one of its ends, an inner cone for receiving an adapter bushing that has a corresponding outer cone and rests on the solid shaft; and the adapter bushing having an axial longitudinal slot; and a contraction disk, including at least one pressure ring, exerting a contraction force on the hollow shaft with the aid of the at least one pressure ring; and the pressure ring having an axial longitudinal slot.

27 Claims, 6 Drawing Sheets

CLAMPING MECHANISM

FIELD OF THE INVENTION

The present invention relates to a clamping mechanism.

BACKGROUND INFORMATION

A clamping mechanism for joining a hollow part to a solid shaft is described in German Published Patent Application No. 42 30 941, which describes fitting a solid shaft into the hollow part without clearance, two conical rings being pressed against each other. The force-receiving part (See German Published Patent Application No. 42 30 941, Figure, reference numeral 19) retains the expansions and deformations of the hollow part caused by this pressing against one another and thus reduces the elasticity of the hollow part.

It is also disadvantageous that the number of parts is high, and it is costly to manufacture the hollow part and especially two parts (27, 32) having a cone. In addition, during mounting of the clamping assembly, the solid shaft is pressed, and the clamping force or contraction force is produced by movement of the ring (See German Published Patent Application No. 42 30 941, Figure, reference numeral 33) and of the inwardly-directed flange (See German Published Patent Application No. 42 30 941, Figure, reference numeral 34). In so doing, the hollow part is shifted axially relative to the solid shaft. This is a considerable disadvantage if the hollow part is used in a gear unit or other device and is held in its axial position by suitable components, e.g., by retaining rings. Considerable forces are then generated which stress the bearings and may lead to their failure.

In addition, in the region of the force-receiving part (See German Published Patent Application No. 42 30 941, Figure, reference numeral 19), the hollow part has a stair-step profile of the inside diameter which leads to a stress concentration and therefore represents a possible breaking point.

A further disadvantage is that when removing or during disassembly, the screws (See German Published Patent Application No. 42 30 941, Figure, reference numeral 21) must be unscrewed and other screws having a larger thread must be screwed in. Thus, it is necessary to keep such other screws on hand for the disassembly. This requires too much effort and is costly. In addition, during disassembly, the clamping ring (See German Published Patent Application No. 42 30 941, Figure, reference numeral 33) must be turned in order to offer an opposite surface on the force-receiving part (See German Published Patent Application No. 42 30 941, Figure, reference numeral 19) to the other screws. This turning is troublesome, particularly when corrosion or changes such as sticking or the like have taken place during the service life.

Therefore, it is an object of the present invention to provide a clamping mechanism which is as inexpensive and easy to handle as possible.

SUMMARY

According to the present invention, the foregoing objective is achieved in the clamping mechanism for securing a hollow shaft or a hollow part to a solid shaft according to the features described herein.

According to an example embodiment of the present invention, the hollow shaft or the hollow part has, at least one of its ends, an inner cone for receiving an adapter bushing which has a corresponding outer cone and rests on the solid shaft. At least the one end, a contraction disk, including at least one pressure ring is provided on the hollow shaft or hollow part for exerting a contraction force.

According to one aspect of the present invention, when securing or tightening the clamping mechanism, it may be possible to keep the relative position with respect to the component to be joined as exact as possible. The present invention may provide that the hollow part to be clamped may also be reliably braced radially on solid shafts which are roughly-toleranced and/or are different in the nominal diameter, using an inexpensive and uncomplicated construction which makes due with as many standard component parts as possible and needs only a small mounting length.

A fitting without clearance may be possible in a cost-effective manner using few parts, e.g., inexpensive standard parts. In this context, the hollow shaft may have an inner cone, which is why stepped profiles may not have to be implemented, and stress concentration may be reduced or even completely avoidable. In addition, the inner cone makes the hollow shaft elastic and sufficiently deformable in order to pass on the geometric changes.

In each case a contraction disk, including at least one pressure ring, may be provided at both ends on the hollow shaft or hollow part for exerting a contraction force.

In another example embodiment of the present invention, in each case the hollow shaft or the hollow part may include at both ends an inner cone for receiving a specific adapter bushing which has a corresponding outer cone and rests on the solid shaft, a clamping ring being provided at the other end for the axial fixation of the corresponding adapter bushing. This clamping ring may be very compact and able to be produced inexpensively, and axially may have only a small overall length. In addition, such a clamping ring provided on the appertaining adapter bushing may be sufficient, since it may only have to produce the hold necessary for the axial fixation of the adapter bushing. The transfer of torque and/or force between the hollow part and the solid shaft may be provided by the other adapter bushing having the associated contraction disk. Moreover, an aspect in this design approach using a clamping ring may also be that a cylindrical solid shaft may be used which, e.g., because of the small processing expenditure, may be produced more inexpensively than a solid shaft having an end stop, thus a non-constant diameter. Therefore, no end stop or shoulder, to be provided at one end, may be necessary. The customer may be able to shift the hollow shaft, together with the clamping ring and contraction disk, axially to the optimum position on the cylindrical solid shaft. In particular, a customer may also be able to utilize a partial cylindrical section of his existing solid shaft and determine the axial position of the hollow shaft independently of any position of a shoulder on the solid shaft.

The contraction force may act so that the inner cone and the outer cone are shrunk onto each other.

In an example embodiment of the present invention, the adapter bushing has an axial longitudinal slot, and the contraction disk, including at least one pressure ring, exerts a contraction force on the hollow shaft or hollow part with the aid of the at least one pressure ring, and the pressure ring has an axial longitudinal slot.

The hollow shaft may have no slot. This may provide that the hollow shaft may be produced inexpensively.

The inner cone of the solid shaft may be machined by grinding. This arrangement may permit a particularly good fit.

The contraction disk may include at least one pressure ring, at least one bracing disk, at least one tightening disk and at least screws. This may provide that a standard contraction disk may be usable with standard component parts.

The contraction disk and/or the bracing disk and/or the tightening disk may be situated axially within the hollow shaft. This arrangement may provide that the mounting length is extremely short.

The adapter bushing may include a collar formed such that during disassembly, extraction may be practicable with the aid of the extraction disk. A very simple and quick disassembly may be carried out without special aids.

The extraction disk may include screw holes for the screws for tightening the contraction disk, e.g., during assembly, and further screw holes for the disassembly, loosening the contraction disk and/or the extraction of at least the adapter bushing. In this case, no further screws may be needed, and it may not be necessary to turn the extraction disk during disassembly.

The solid shaft may include an end stop for limiting the axial position of a further adapter bushing. The solid shaft may be able to be fitted in a simple manner using two adapter bushings of the same kind.

The further adapter bushing may include an outer cone and/or a collar. The collar may be usable for the extraction, and therefore the need for further parts or the use of further tools may be eliminated. Furthermore, the outer cone is an easy-to-manufacture arrangement for producing the fit.

A further aspect of the present invention is that the same screws may be usable during the extraction as during the tightening, thus, the same screws may be used during assembly and disassembly. Moreover, at the same time, no turning may be necessary, because suitably positioned screw holes may already be present.

In another example embodiment of the present invention, at one end of the hollow shaft, a supporting disk may able to be mounted which may be detachably connectible to the solid shaft by a tightening screw. Therefore, the hollow shaft may be centered axially and prestressed with respect to the solid shaft.

In another example embodiment of the present invention, the cone angle of the outer cone of the adapter bushing may be selected such that the adapter bushing is not self-locking. In this example embodiment, the supporting disk, together with the tightening screw, additionally produces a mechanical locking. Consequently, such cone angles may also be usable which may permit an even easier disassembly.

In another example embodiment of the present invention, the cone angle of the outer cone of the adapter bushing may be selected such that the adapter bushing is self-locking. In this case, further components for the mechanical locking, etc., may not be necessary, and therefore simple and inexpensive constructions may be possible.

REFERENCE NUMERAL LIST

1 SOLID SHAFT
2 HOUSING
3 HOLLOW SHAFT
4 ADAPTER BUSHING (slotted)
5 PRESSURE RING OF THE CONTRACTION DISK (slotted)
6 BRACING DISK OF THE CONTRACTION DISK
7 TIGHTENING DISK OF THE CONTRACTION DISK
8 SCREWS
9 RETAINING RING
10 SUPPORTING DISK
11 ADAPTER BUSHING (slotted)
12 SHAFT SEALING RING
13 SEALING RING FLANGE
14 BEARING OF THE HOLLOW SHAFT
15 WHEEL
16 BEARING OF THE HOLLOW SHAFT
17 SEALING RING FLANGE
18 SHAFT SEALING RING
19 SCREW HOLES with screw bore hole
20 SCREW HOLES with screw tapped hole
21 AXIAL LONGITUDINAL SLOT of the adapter bushing
22 END STOP
23 AXIAL LONGITUDINAL SLOT of the pressure ring
24 SUPPORTING DISK
25 TIGHTENING SCREW
26 CLAMPING RING
26.A CLAMPING RING contact surface
26.B CLAMPING RING centering pressure bore hole
26.C CLAMPING RING axial longitudinal slot
27 ADAPTER BUSHING
27.A ADAPTER BUSHING centering cone
27.B ADAPTER BUSHING outer centering seat
27.C ADAPTER BUSHING slot
28 CLAMPING SCREW clamping ring The present invention shall now be explained in detail with reference to the figures.

DETAILED DESCRIPTION

Figure 1:
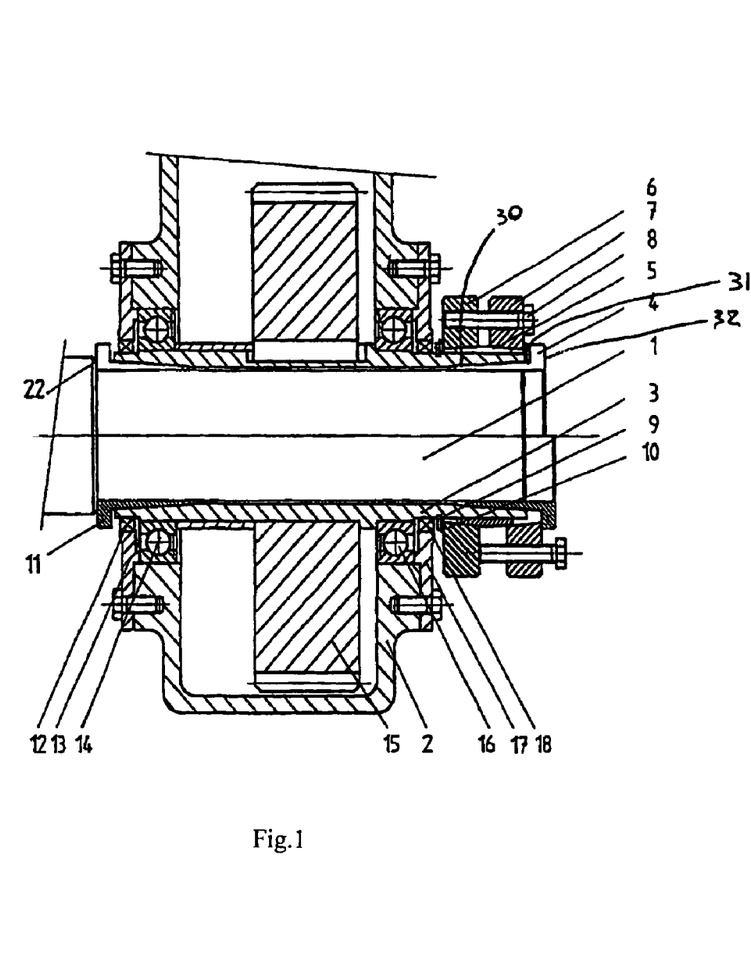
FIG. 1 illustrates a clamping mechanism of the present invention in plan view and cross-sectional view.

A hollow shaft 3 is supported in housing 2 by bearings 14, 16. The housing is designed with sealing ring flange 13, 17 and shaft sealing ring 12, 18, respectively, for the sealing.

Wheel 15 is disposed on hollow shaft 3. Solid shaft 1 is arranged within hollow shaft 3. During assembly, solid shaft 1 is inserted into hollow shaft 3.

Hollow shaft 3 is arranged at its one end with an inner cone for receiving an adapter bushing 4. At another location, solid shaft 1 has an end stop 22 to limit the axial position of a further adapter bushing 11. Hollow shaft 3 has an inner tapered surface 30, also referred to as an inner cone, for receiving adapter bushing 11. The inner cones are in each case ground and arranged geometrically such that adapter bushings 4, 11 with outer tapered surface 31, also referred to as outer cone, are able to be introduced between solid shaft 1 and hollow shaft 3.

Using a contraction disk, which includes a pressure ring 5, a bracing disk 6, a tightening disk 7 and screws 8, the end of hollow shaft 3 on the contraction-disk side is shrunk onto adapter bushing 4 such that the adapter bushing shrinks onto and presses on solid shaft 1.

To be able to easily pass on the elastic deformations occurring, adapter bushing 4 has an axial longitudinal slot 21. Thus, adapter bushing 4 draws together in the circumferential direction and presses radially onto solid shaft 1. Therefore, a tight fit with force-locking is achieved.

Adapter bushing 11 has an axial slot. This may ensure that the adapter bushing already positions itself against solid shaft 1 and hollow shaft 3 in response to small axial forces.

During assembly, adapter bushing 11 is first pre-mounted on solid shaft 1. Solid shaft 1 is then inserted, together with adapter bushing 11, into hollow shaft 3. Therefore, from a certain insertion depth, adapter bushing 11 then centers itself and consequently, in particular, solid shaft 1 as well. The insertion ends in the axial direction when adapter bushing 11 contacts the shoulder formed as end stop 22. Thereupon, in the case of the contraction disk, a bracing disk 6 and a tightening disk 7 are moved toward each other by the tightening of screws 8, bracing disk 6 and tightening disk 7 being disposed on a pressure ring 5 having a double outer cone.

Pressure ring 5 rests with its inner side, thus, its inner cylinder, on hollow shaft 3 and has an axial longitudinal slot. Therefore, with increasing tightening of screws 8, bracing disk 6 and tightening disk 7 press ever more onto pressure ring 5, which thus contracts in the circumferential direction and presses onto hollow shaft 3. Particularly because of the inner cone, this region of the hollow shaft may be sufficiently thin-walled and elastic, such that the deformation of this region of hollow shaft 3 causes adapter bushing 4 to shrink.

In the plan view of FIG. 1, at a screw hole 19, associated screw 8 is illustrated in the removed state.

During disassembly, screws 8 are unscrewed from screw holes 19 and screwed into other screw holes 20 which are staggered at the periphery of tightening disk 7 such that no correspondingly associated screw holes are located in bracing disk 6. Consequently screws 8 are braced against bracing disk 6 for the extraction of tightening disk 7. A supporting disk 10 and a retaining ring 9 establish the axial position of bracing disk 6. At its thicker-walled end, adapter bushing 4 has a collar having an outer diameter such that tightening disk 7 pulls out adapter bushing 4. Consequently, the same screws are useable for the tightening and the extraction.

Tightening disk 7 is arranged within the axial region of hollow shaft 3.

With the aid of the present invention, given the same hollow shaft, various solid shafts are usable when working with the clamping mechanism according to the present invention, since even if the nominal diameter of the solid shaft is roughly toleranced, the contraction disk joins the hollow shaft to the solid shaft by adapter bushing 4. The appertaining tolerance range is a function at least of the elasticity of hollow shaft 3 and the slant of the cone.

Thus, the present invention may provide that given different nominal diameters of solid shaft 1, the same hollow shaft 3 may be used. In this context, all other parts are also reusable, with the exception of adapter bushings 4, 11.

Thus, for a manufacturer of devices having a hollow part, the manufacturer may be able to supply customers who use solid shafts having nominal diameters according to the metric or according to the inch system. Using the present invention, after exchanging the, for example, metric adapter bushings for adapter bushings having an inside diameter measured in inches, complete compatibility and utilization are given.

In addition, roughly-toleranced solid shafts 1, thus, solid shafts having a nominal diameter from a large tolerance range are usable, because such diameter variations are accommodated by small axial shifts of adapter bushings 4, 11 and by the high elasticity along the periphery of adapter bushings 4, 11 as a result of axial longitudinal slot 21.

Figure 2:
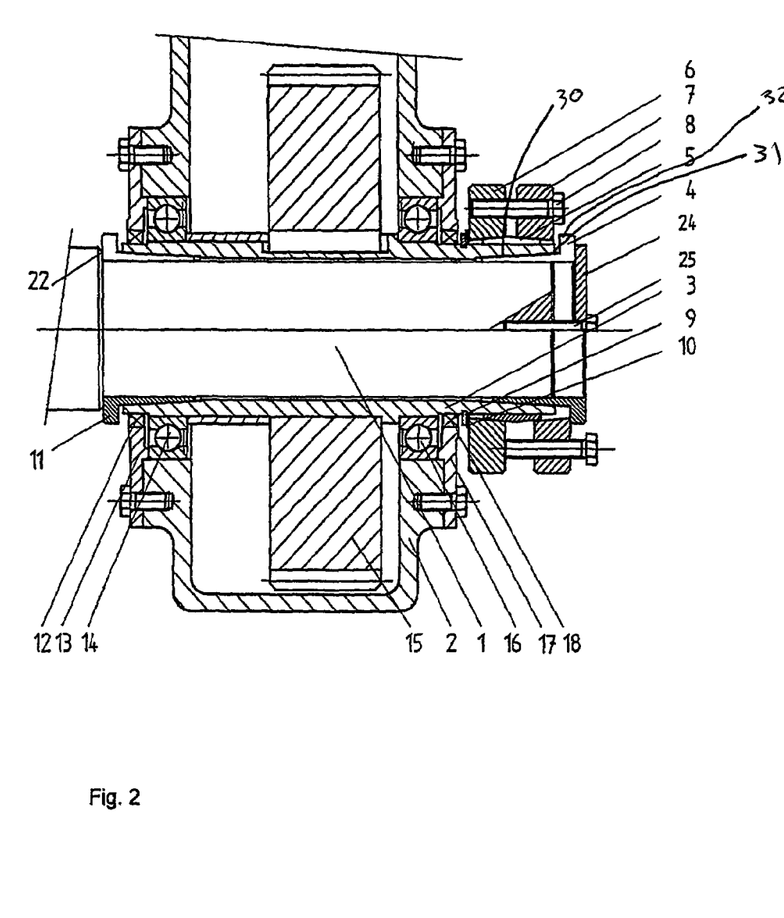
FIG. 2 illustrates a clamping mechanism according to the present invention in plan view and cross-sectional view.

FIG. 2 illustrates a further exemplary embodiment according to the present invention. In this case, the tightening of tightening screw 25 causes an axial setting and centering of the parts. Namely, in response to the tightening, supporting disk 24 presses against adapter bushing 4, which in turn is pressed onto hollow shaft 3. Therefore, hollow shaft 3 is pressed against adapter bushing 11, and adapter bushing 11 is pressed against shoulder 22 of solid shaft 1.

In further exemplary embodiments of the present invention, adapter bushing 4 may be implemented with a cone angle which results in automatic locking or non-automatic locking of adapter bushing 4.

The property of automatic locking or non-automatic locking is determined by the selection of the cone angle of the outer cone of adapter bushing 4, the selection of the materials of the contacting parts such as adapter bushing 4, hollow shaft 1, etc., and by the selection of the lubricant.

In a further exemplary embodiment of the present invention with non-automatic locking, tightening screw 25, together with supporting disk 24, produces a prestressing which is definable on the basis of the tightening torque, and additionally produces an axial, mechanical locking.

Figure 6A:
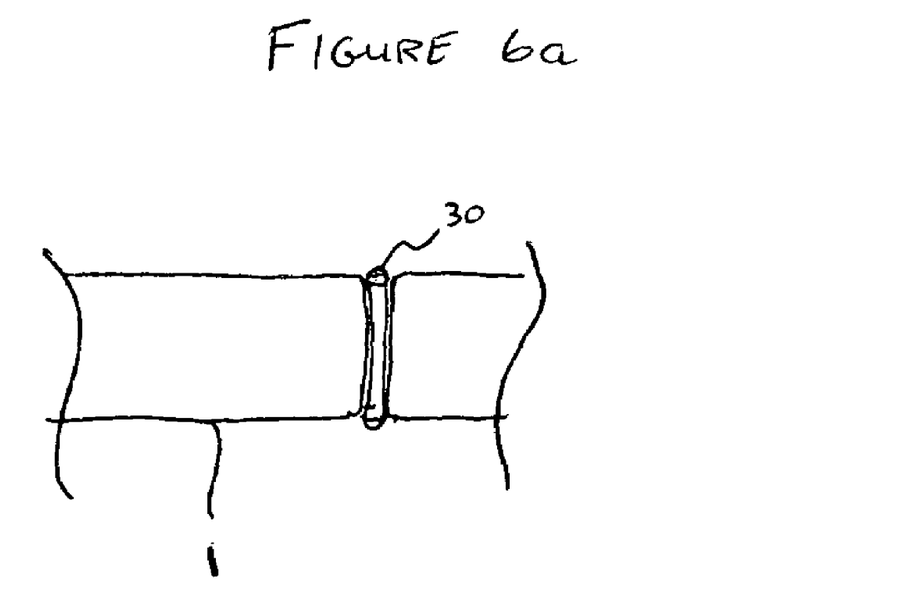
FIG. 6a illustrates a portion of the solid shaft with a retaining ring 30.
Figure 6B:
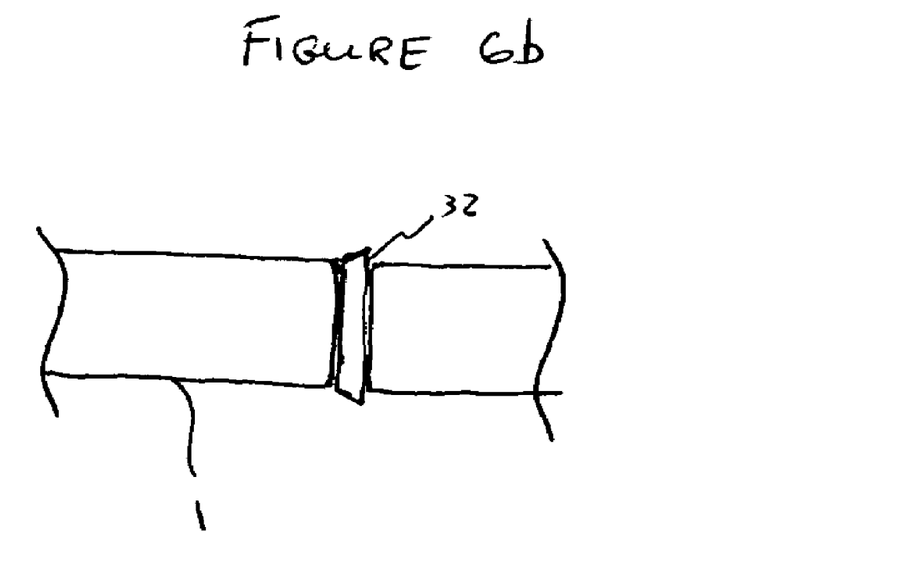
FIG. 6b illustrates a portion of the solid shaft with a shim ring 32.

In other exemplary embodiments of the present invention, instead of supporting disk 24 and tightening screw 25, at least one retaining ring is used which is sunk into a groove in the solid shaft. In addition—depending on the specific special construction—shim rings are also usable. It is thus possible to produce the mechanical locking inexpensively using standard component parts. Given suitable dimensioning, even a prestressing is possible within the framework of the present invention.

The present invention also relates to devices which have no adapter bushing 11 and associated end stop 22.

Figure 3:
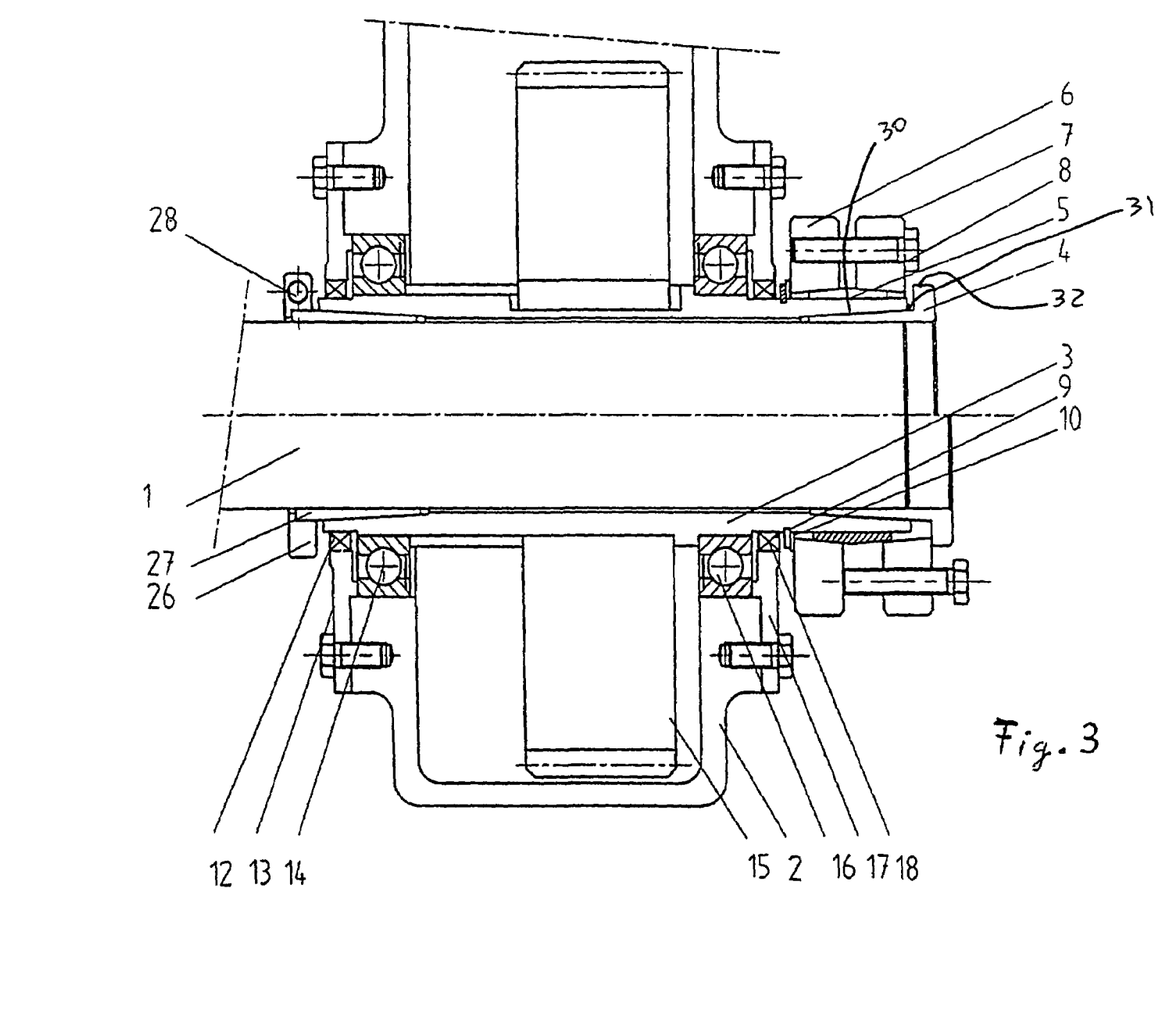
FIG. 3 illustrates another exemplary embodiment of the present invention.
Figure 4:
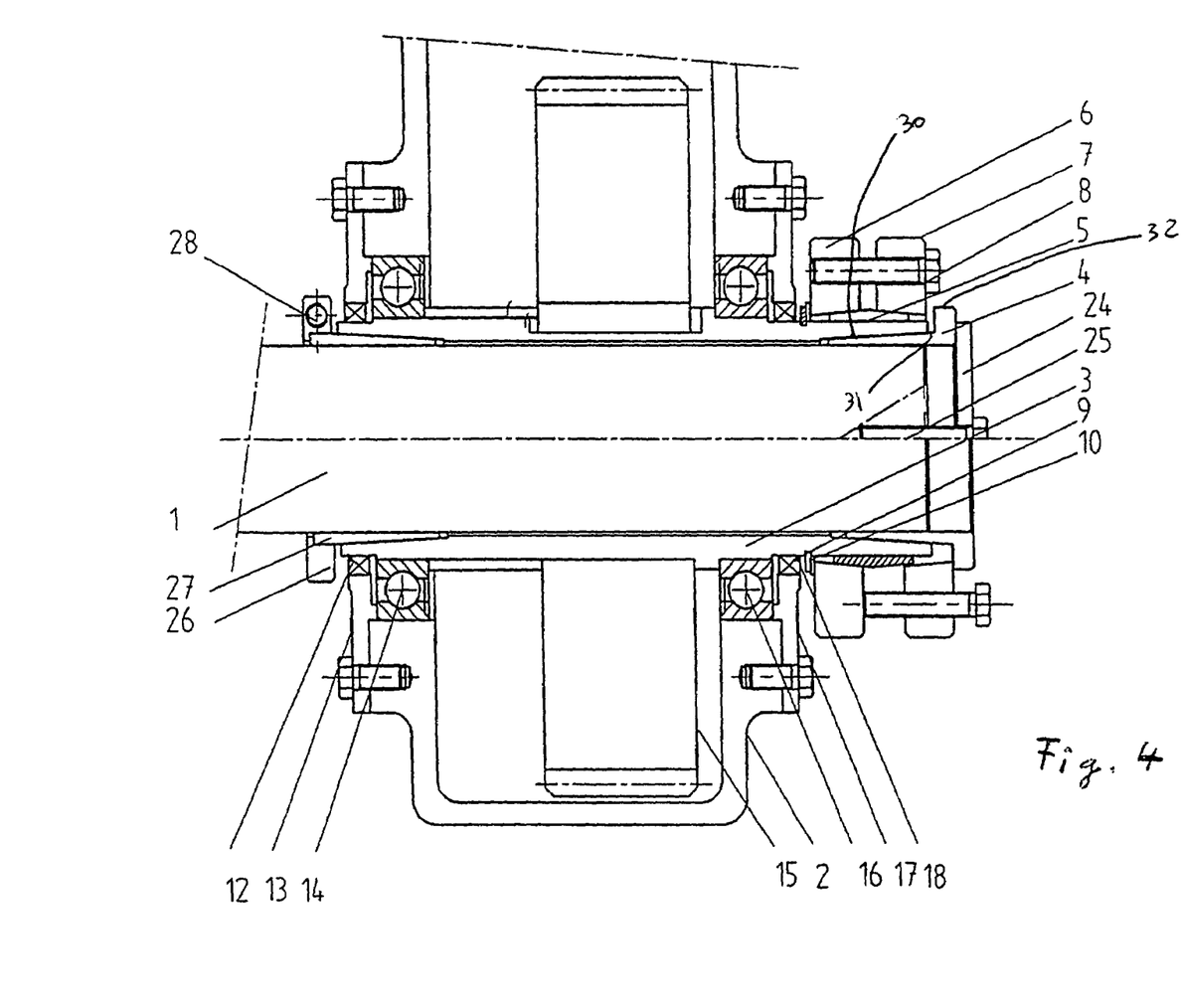
FIG. 4 illustrates another exemplary embodiment of the present invention.

FIG. 3 illustrates another exemplary embodiment according to the present invention which, at the end facing the contraction disk, is similar to FIG. 1. Deviating from FIG. 1, however, is that solid shaft 1 is implemented without end stop 22. Thus, solid shaft 1 may be produced particularly easily. Clamping ring 26 is used for the axial fixation of adapter bushing 27. Since the clamping ring is used for the axial fixation and does not have to make a significant contribution to the transfer of torque and/or force, it may be implemented in a compact fashion and requires only a little, particularly axial, overall length. In addition, an inexpensive standard part may be usable as the clamping ring. The connection for transmitting torque and/or force is provided, as also in the exemplary embodiments of the present invention illustrated in FIGS. 1 and 2, by the contraction disk and the associated adapter bushing there FIG. 4 illustrates another exemplary embodiment according to the present invention which, at the end facing the contraction disk, is similar FIG. 2. Deviating from FIG. 2, however, solid shaft 1 is implemented without end stop 22. Clamping ring 26 is used for the axial fixation of adapter bushing 27, the aspects corresponding to the aforesaid aspects.

Figure 5:
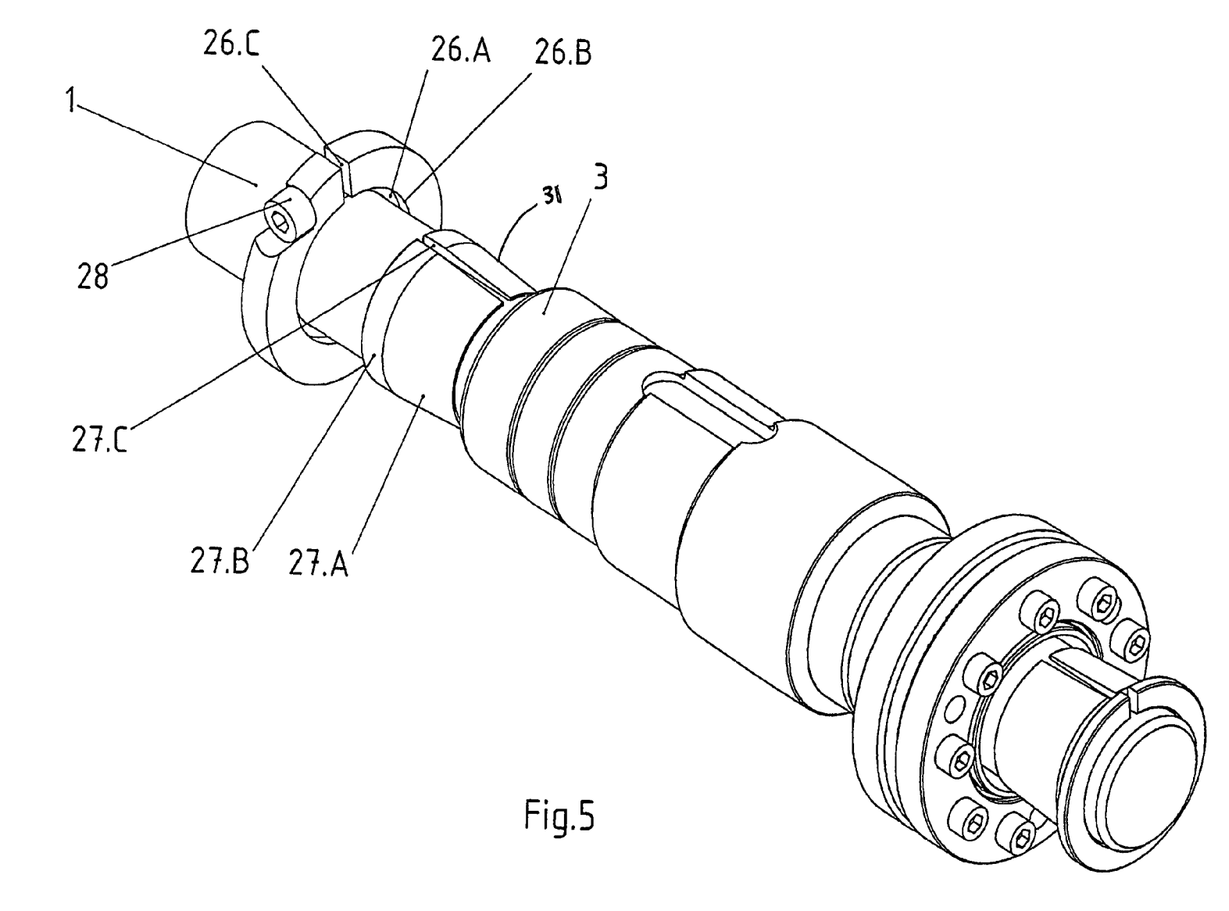
FIG. 5 illustrates another exemplary embodiment of the present invention.

In FIG. 5, the exemplary embodiment of the present invention illustrated in FIG. 3 is illustrated in spatial representation. In so doing, the parts are illustrated in an exploded view, thus are visible individually, pushed apart from each other. Clamping ring 26 is joined to adapter bushing 27 by the tightening of clamping screw 28, the distance at the periphery in the case of axial longitudinal slot 26.C, and therefore also the inside diameter of centering pressure bore hole 26.B being reduced. Clamping ring 26, with its centering pressure bore hole 26.B, contacts outer centering seat 27.B of adapter bushing 27, which with its centering cone 27.A is able to be joined to hollow shaft 3 at its inner cone. Slot 27.C of adapter bushing 27 may permit a uniform contraction of adapter bushing 27 at the periphery. Contact surface 26.A forms the axial end stop for adapter bushing 27. In this context, care may be taken that the clamping ring has a suitable profile, which is illustrated in cross-section representation in FIG. 3 and FIG. 4. The profile has a gradation for forming the indicated end stop for adapter bushing 3, such that axially, the adapter bushing is only able to extend partially into the clamping ring.

What is claimed is:

1. A clamping mechanism for securing one of a hollow shaft and a hollow part on a solid shaft, comprising:
    at least one adapter bushing including an outer tapered surface and arranged to rest on the solid shaft;
    an inner tapered surface arranged at at least a first end of the one of the hollow shaft and the hollow part, the inner tapered surface configured to receive one of the at least one adapter bushings, the outer tapered surface of the bushing corresponding to the inner tapered surface;
    at least one contraction disk including at least one pressure ring arranged on the one of the hollow shaft and the hollow part at least the first end of the one of the hollow shaft and the hollow part, the contraction disk exerting a radial contraction force on the one of the hollow shaft and the hollow part, the adapter bushing and the solid shaft; and
    a clamping ring arranged on one end of the one of the hollow shaft and the hollow part and configured for axial fixation of a corresponding one of the at least one adapter bushings;
    wherein the at least one pressure ring has a cylindrical inner surface and an outwardly projecting, double frustoconical outer surface.

2. The clamping mechanism according to claim 1, wherein a second end of the one of the hollow shaft and the hollow part includes an inner tapered surface configured to receive one of the at least one adapter bushings having a corresponding outer tapered surface and arranged to rest on the solid shaft, the second end of the one of the hollow shaft and the hollow part including one of the at least one contraction disks having at least one pressure ring arranged on the one of the hollow shaft and the hollow part.

3. The clamping mechanism according to claim 1, wherein the contraction force is arranged to act so that the inner tapered surface and the outer tapered surface are shrunk onto each other.

4. The clamping mechanism according to claim 1, wherein the at least one pressure ring is configured to exert the contraction force on the one of the hollow shaft and the hollow part.

5. The clamping mechanism according to claim 1, wherein the pressure ring includes an axial longitudinal slot.

6. The clamping mechanism of claim 5, wherein the axial longitudinal slot in the pressure ring facilitates contraction of the pressure ring.

7. The clamping mechanism according to claim 1, wherein the adapter bushing includes an axial longitudinal slot.

8. The clamping mechanism of claim 7, wherein the axial longitudinal slot in the adaptor bushing ring facilitates contraction of the adaptor bushing.

9. The clamping mechanism according to claim 1, wherein the hollow shaft is slotless.

10. The clamping mechanism according to claim 1, wherein the inner tapered surface is machined by grinding.

11. The clamping mechanism according to claim 1, wherein the contraction disk includes at least one pressure ring, at least one bracing disk, and screws.

12. The clamping mechanism according to claim 11, wherein at least one of the contraction disk, and the bracing disk is located within an axial extent of the hollow shaft.

13. The clamping mechanism according to claim 1, wherein the adapter bushing includes a collar formed so that during disassembly extraction is provided by an extraction disk.

14. The clamping mechanism according to claim 13, wherein the extraction disk includes first screw holes configured to receive first screws to tighten the contraction disk and second screw holes configured to receive second screws to at least one of loosen the contraction disk and extract at least the adapter bushing.

15. The clamping mechanism according to claim 14, wherein the first screw holes are configured to receive the first screws to tighten the contraction disk during assembly and the second screw holes are configured to receive the second screws to at least one of loosen the contraction disk and extract at least the adapter bushing during disassembly.

16. The clamping mechanism according to claim 1, wherein the solid shaft including an end stop configured to limit an axial position of a further adapter bushing.

17. The clamping mechanism according to claim 16, wherein the further adapter bushing includes at least one of an outer tapered surface and a collar.

18. The clamping mechanism according to claim 1, further comprising a component configured to act on the solid shaft and to be joined to the solid shaft so that the solid shaft is at least one of axially positioned, locked and prestressed with respect to the one of the hollow shaft and the hollow part.

19. The clamping mechanism according to claim 18, wherein at least one of the component is configured to produce an axial mechanical locking.

20. The clamping mechanism according to claim 18, wherein the component at least one of (a) includes a tightening screw and a supporting disk and (b) is mounted at one end of the one of the hollow shaft and the hollow part.

21. The clamping mechanism according to claim 18, wherein the component includes at least one retaining ring configured to sink into a groove in the solid shaft.

22. The clamping mechanism according to claim 18, wherein the component includes at least one shim ring.

23. The clamping mechanism according to claim 18, wherein the component is configured to be joined to the solid shaft by tightening.

24. The clamping mechanism according to claim 18, wherein the component is configured to be joined to the solid shaft by tightening a screw.

25. The clamping mechanism according to claim 1, wherein the contraction disk is configured to exert the radial contraction force on the one of the hollow shaft and the hollow part, the adapter bushing and the solid shaft while maintaining a position of the solid shaft relative to a position of the one of the hollow shaft and the hollow part.

26. The clamping mechanism according to claim 1, wherein the contraction disk is configured to exert the radial contraction force on the one of the hollow shaft and the hollow part, the adapter bushing and the solid shaft at a location corresponding to the inner tapered surface and the outer tapered surface.

27. A clamping mechanism for securing one of a hollow shaft and a hollow part on a solid shaft, comprising:
    an adapter bushing including an outer tapered surface and arranged to rest on the solid shaft;
    an inner tapered surface arranged at least one end of the one of the hollow shaft and the hollow part, the inner tapered surface configured to receive the adapter bushing, the outer tapered surface of the bushing corresponding to the inner tapered surface;

a contraction disk including at least one pressure ring, arranged on the one of the hollow shaft and the hollow part at the at least one end of the one of the hollow shaft and the hollow part, and at least one tightening disk, the contraction disk configured to exert a radial contraction force on the one of the hollow shaft and the hollow part, the adapter bushing and the solid shaft via movement of the at least one tightening disk along a longitudinal axis of the hollow shaft; and a clamping ring arranged on one end of the one of the hollow shaft and the hollow part and configured for axial fixation of a corresponding one of the at least one adapter bushings;

wherein the at least one pressure ring has a cylindrical inner surface and an outwardly projecting, double frustoconical outer surface.

* * * * *